A. L. COREY.
Chain-Pump Bucket.

No. 160,881.  Patented March 16, 1875.

WITNESSES:
P. C. Dieterich
W. C. McArthur

INVENTOR:
A. L. Corey
per J. H. Alexander
ATTORNEY.

THE GRAPHIC CO.PHOTO-LITH.39 & 41 PARK PLACE,N.Y.

UNITED STATES PATENT OFFICE.

AARON L. COREY, OF YPSILANTI, MICHIGAN.

IMPROVEMENT IN CHAIN-PUMP BUCKETS.

Specification forming part of Letters Patent No. 160,881, dated March 16, 1875; application filed January 23, 1875.

*To all whom it may concern:*

Be it known that I, AARON L. COREY, of city of Ypsilanti, in the county of Washtenaw and State of Michigan, have invented certain new and useful Improvements in Bucket for Chain-Pumps; and I do hereby declare that the following is a full, clear, and exact description thereof, reference being had to the accompanying drawings, and to the letters of reference marked thereon, which form part of this specification.

The nature of my invention consists in the construction and arrangement of a bucket for chain-pumps, as will be hereinafter more fully set forth.

In order to enable others skilled in the art to which my invention appertains to make and use the same, I will now proceed to describe its construction and operation, referring to the annexed drawing, in which—

Figure 1:
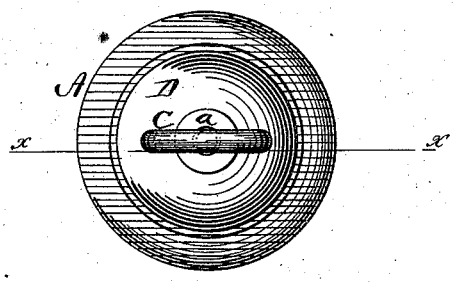
Figure 2:
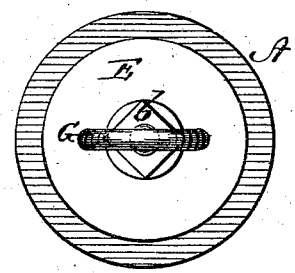
Figure 3:
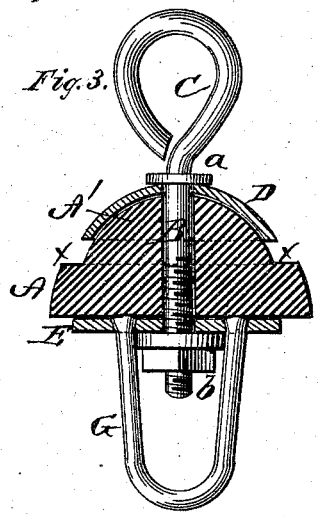

Figure 1 is a plan view, and Fig. 2 a bottom view, of my chain-pump. Fig. 3 is a vertical section through the line $x$ $x$, Fig. 1.

A A' represent the rubber part of my bucket, made all in one piece, but in form or shape as if it were two different pieces. The lower part A is a disk of suitable diameter, with beveled or rounded edges, and on top of the same is the semi-spherical or bell-shaped part A'. Through the center of the part A A' is a vertical hole for the passage of a screw, B, which is formed with a loop or eye, C, at its upper end. On the screw B, below the eye C, is placed or attached a collar or washer, $a$, as shown. On the bell part A' of the rubber is placed a cap, D, and the screw B is passed down through this cap and the rubber A A', the collar or washer $a$ coming in contact with the cap. E represents a metal plate, to which is permanently attached a bail, G. This plate is placed against the under side of the rubber, and within the bail is placed a nut, $b$. The screw B passes through a hole in the center of the plate, and screws into the nut $b$, to hold the parts together. This nut, being placed within the bail G, is, so to say, perfectly locked, and cannot work loose. The cap D is pressed down upon the rubber by screwing down the screw B, and, in connection with the offset $f$ between the two parts A and A' of the rubber, expands the rubber without its losing any of its elasticity. The rubber can thus be expanded from time to time as it wears, and will retain the same elasticity as when new.

Having thus fully described my invention, what I claim as new, and desire to secure by Letters Patent, is—

1. In a bucket for chain-pumps, the rubber herein described, formed of the disk A and bell A', with offset $x$, all in one piece, as herein set forth.

2. The rubber A, formed with the oval top A' and projection $x$, in combination with the bell-shaped cap D, screw B, plate E, bail G, and nut $b$, all arranged as shown, and for the purpose set forth.

In testimony that I claim the foregoing as my own I hereby affix my signature in presence of two witnesses.

AARON L. COREY.

Witnesses:
S. M. CUTCHEON,
D. B. BAKER.